United States Patent
Cormack et al.

(10) Patent No.: US 6,839,709 B2
(45) Date of Patent: Jan. 4, 2005

(54) LAYERED RESOURCE STRUCTURE AND METHOD

(75) Inventors: Christopher J. Cormack, Hillsboro, OR (US); Jeff R. Jackson, Newberg, OR (US)

(73) Assignee: Intel Corporation, Santa Clara, CA (US)

(*) Notice: Subject to any disclaimer, the term of this patent is extended or adjusted under 35 U.S.C. 154(b) by 437 days.

(21) Appl. No.: 10/102,057

(22) Filed: Mar. 19, 2002

(65) Prior Publication Data

US 2003/0182280 A1 Sep. 25, 2003

(51) Int. Cl.[7] .............................................. G06F 17/30
(52) U.S. Cl. .......................................... 707/10; 709/222
(58) Field of Search .................... 707/10, 100; 370/235, 370/269, 397; 709/222; 324/158.1, 763, 765; 379/208.01, 269; 718/101; 713/176; 361/119; 712/1, 11

(56) References Cited

U.S. PATENT DOCUMENTS

| | | | | |
|---|---|---|---|---|
| 5,506,992 A | * | 4/1996 | Saxenmeyer | 712/11 |
| 5,737,406 A | * | 4/1998 | Dagberg et al. | 379/269 |
| 5,822,603 A | * | 10/1998 | Hansen et al. | 712/1 |
| 6,693,878 B1 | * | 2/2004 | Daruwalla et al. | 370/235 |

* cited by examiner

*Primary Examiner*—Diane D. Mizrahi
(74) *Attorney, Agent, or Firm*—Blakely, Sokoloff, Taylor & Zafman LLP

(57) ABSTRACT

A layered resource data structure includes several layers of resources, organized by access priority. A code module is linked to an access path through the layers of the resource data structure. The code module requests resources by accessing the resources in turn in each of the layers of the resource data structure until a resource matching the resource request is located. Resources are added to and removed from the data structure without requiring custom code modifications.

35 Claims, 11 Drawing Sheets

LAYERED RESOURCE STRUCTURE AND METHOD

FIELD OF THE INVENTION

The invention relates to mechanisms for storing data in a computer system, and more particularly to data structures for storing resource information and resource libraries.

BACKGROUND

In designing computer programs or other code modules, it is desirable to provide resources to the program that are linked with the program dynamically, as the program is executed. Providing these resources dynamically allows the code modules to be written in more general terms and then tailored to specific environments by varying the resources provided at run-time.

One popular way to provide these resources is by using a Dynamic Linked Library (DLL). A DLL is a collection of resources, each resource having an associated resource identifier. When a developer writes a code module, the developer can identify the desired resource to include by using the resource identifier. Later on, when the code module is executed, the computer system uses the resource identifier to locate the resource contained in the DLL, and then uses the located resource in the operation of the code module. Where it is desirable to vary the resource, only the DLL containing the startup screen resource need be changed. For example if the resource is a startup screen and different vendors wish to display different startup screens when the code module is executed, then each vendor will supply a different startup screen image, but the image will be linked to the same resource identifier. Thus, when the code module executes, it will load a vendor-specific startup screen.

One conventional method of organizing resources into DLLs is to create a separate DLL for each code module, the DLL containing all of the resources that the code module needs to properly execute. This method is inefficient, however, in cases where many of the resources are common to multiple code modules. These common resources are duplicated across many DLLs, which leads to many extra copies of the same resource being present throughout the various DLLs resident in the computer system. This massive duplication of resources is wasteful of storage space and leads to bloated software.

One solution to this problem is to providing multiple DLLs for each code module to access. Resources specific to a particular code module are placed into an application-specific DLL, and shared resources are placed into a shared DLL. Additional DLLs may be created as needed, for example to implement bug fixes or to allow for vendor or customer customization of the code module's resources. Each code module therefore can access several different DLLs.

A drawback to this solution, however, is that the code module needs some way of figuring out which DLL it should access when looking for a resource. The code module cannot easily discern which DLL to use. For example, it is common for a manufacturer of a code module to provide a base DLL that contains default resources. A middleman such as a distributor or vendor of the code module may also supply a DLL containing other resources, possible including some resources associated with the same resource identifiers as used in the base DLL. A purchaser of the code module may also create a custom-designed DLL containing yet other resources, possibly including resources associated with the same resource identifiers as used in the other DLLs. If all three of these DLLs are present when the software executes, then the code module needs some way of determining which DLL to access.

One solution to this dilemma is to write customized selection code that tells the code module which DLL to use. Each time the code module makes a call to a resource identifier, the call is passed through the customized selection code to determine which DLL to use. The customized selection code contains program logic provided by the various DLL suppliers, which helps determine which DLL to use. This program logic, however, has to be modified and updated each time a DLL is added or removed from the computer system. These modifications increase computer overhead and lead to inefficient use of computer resources.

Thus, an apparatus and method is needed to allow resources to be flexibly stored and easily maintained, without requiring modifications to program logic, while minimizing the storage space consumed by the resources.

DETAILED DESCRIPTION OF THE PREFERRED EMBODIMENTS

Figure 1A:
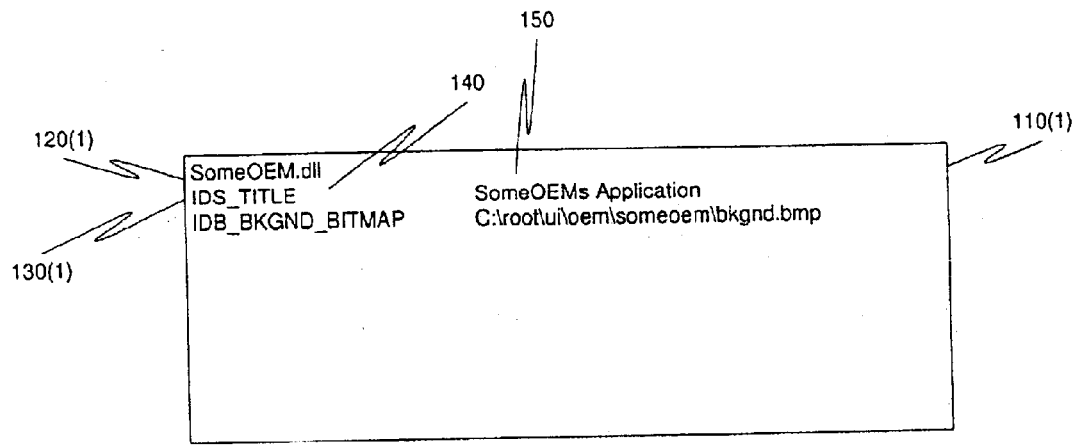
FIGS. 1A–1C are examples of DLLs for use in a resource data structure.
Figure 1B:
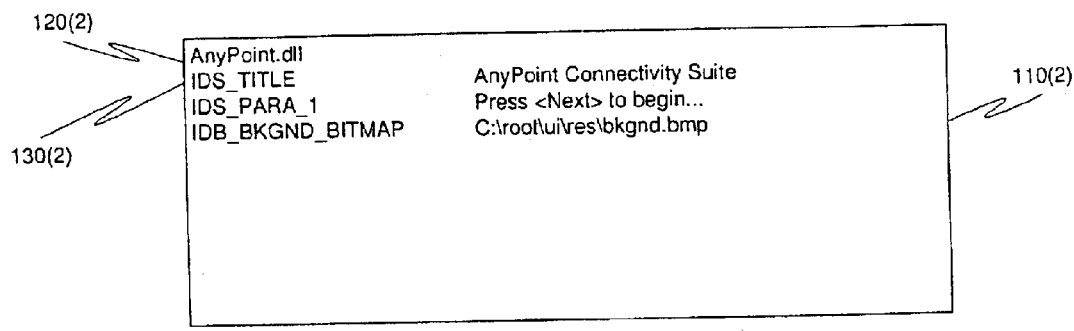
Figure 1C:
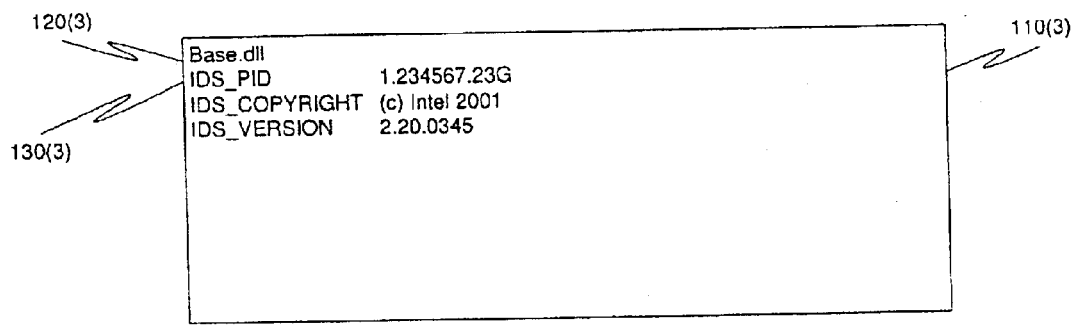

FIGS. 1A–C depict several examples of resources provided to a code module. The resources of FIGS. 1A–C are organized into three DLLs 110(1), 110(2), 110(3). Each DLL 110 has a title 120 and several resource entries 130. Each resource entry 130 includes a resource identifier 140 and a resource value 150. The resource identifier 140 is a value that the code module uses to refer to a resource value 150. The same resource identifier 140 can be linked to multiple resource values 150 by, for example, being used in more than one of the DLLs 110. The code module, however, will typically load only one of the resource values 150 linked to the resource identifier 140. In some embodiments, the resource value 150 is a pointer to a storage location where the resource is actually stored. In other embodiments, the resource value 150 is the resource itself, such as a text string, bitmap or other form of data, stored in the resource entry 130.

A loading rule is used to decide which resource value 150 to load. For example, the resource value 150 with the highest priority, as determined by the loading rule, is loaded into the code module that provided the resource identifier 140. An example priority loading rule provides that a DLL 110 specific to the code module has the highest priority level, followed by a shared DLL 110 provided by a vendor of the code module, followed lastly by a shared DLL 110 provided by a manufacturer of the code module. Thus, when the code module makes a resource request containing a resource request criterion that matches a resource identifier 140, the code module is provided with the associated resource value 150 from the DLL 110 bearing the highest priority amongst those DLLs 110 which contain the resource identifier 140.

Figure 2A:
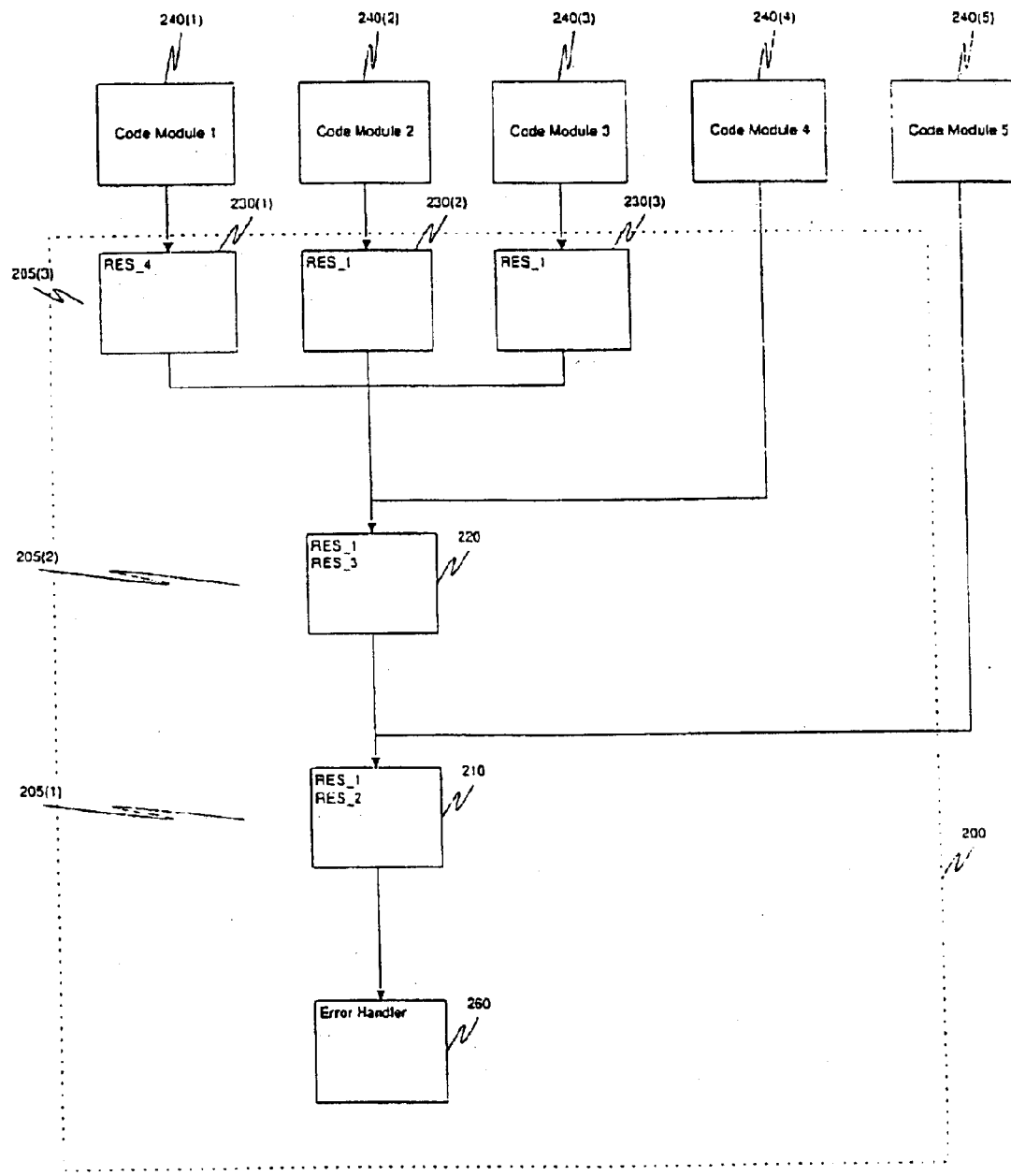
FIG. 2A is a resource data structure.

The priority loading rule discussed above is implemented by creating a resource data structure, such as the DLL structure 200 shown in FIG. 2A. The DLL structure 200 includes several resource layers 205. Each resource layer 205 contains DLLs with a higher access priority level than layers 205 below, and lower access priority than layers 205 above. The DLL structure 200 includes a base layer 205(1) containing a base DLL 210. This base DLL 210 is the lowest level DLL in the DLL structure 200. The base DLL 210 contains the default resource values for the resources contained within the DLL structure 200. Optionally, there can be more than one base DLL 210, as desired by the designer of the DLL structure 200.

The DLL structure 200 also includes a mid-level layer 205(2) containing a mid-level DLL 220. This mid-level DLL 220 can be a vendor-supplied DLL, a customer-designed DLL, or any other DLL that bears a higher priority than the base DLL 210. The mid-level DLL 220 is typically shared between multiple code modules, though it is also within the scope of an embodiment of the invention to provide a module-specific mid-level DLL 220.

The mid-level DLL 220 contains resource entries 130 that are higher in access priority than the resource entries 130 contained in the base DLL 210. Some of the resource values 150 in the mid-level DLL 220 may be associated with the same resource identifier 140 as other resource values 150 in the base DLL 210. Other of the resource values 150 in the mid-level DLL 220 may be associated with resource identifiers 140 not found in the base level DLL 210. Although the embodiment of FIG. 2 depicts a single mid-level layer 205(2), other embodiments can have multiple mid-level layers 205(2), of varying access priority. The number of layers 205 in the DLL structure 200 is freely extensible, as dictated by the needs of particular embodiments.

The DLL structure 200 also includes a top-level layer 205(3) containing several top-level DLLs 230. The top-level DLLs 230 each contain resources with a higher priority than the mid-level DLL 220 or the base level DLL 210. The embodiment of FIG. 2 depicts module-specific top-level DLLs 230. Alternate embodiments can have top-level DLLs 230 that are shared by more than one code module.

Some of the resource values 150 in the top-level DLL 230 may be associated with the same resource identifier 140 as other resource values 150 in the base DLL 210 or the mid-level DLL 220. Other of the resource values 150 in the top-level DLL 230 may be associated with resource identifiers 140 not found in the base level DLL 210 or the mid-level DLL 220.

The access priority scheme for the DLL structure 200 is shown by the arrows between the top-level DLLs 230, mid-level DLL 220, and base level DLL 210. Thus, the top-level DLLs 230 have a higher access priority than the mid-level DLL 220, which has a higher access priority than the base level DLL 210.

The DLL structure 200 is accessed by code modules 240, which are resident in the computer system containing the DLL structure 200. The code modules 240 can access the DLL structure 200 at various points. For example, the code modules 240(1), 240(2), 240(3) each access the DLL structure through the respective top-level DLLs 230(1), 230(2), 230(3). The code module 240(4), however, bypasses the top-level DLLs 230 and accesses the DLL structure 200 through the mid-level DLL 220. Similarly, the code module 240(5) accesses the DLL structure 200 through the base DLL 210.

Once the entry points into the DLL structure 200 are identified for the code modules 240, access paths are defined for each code module 240. An access path is a linked series of DLLs 210, 220, 230, beginning with the initial entry DLL, passing through each DLL in sequence that is pointed to by the previous DLL in the path, and ending at the last DLL in the path. For example, the access path for the code module 240(2) starts at the top-level DLL 230(2), passes through the mid-level DLL 220, and ends at the base-level DLL 210. Similarly, the access path for the code module 240(4) begins at the mid-level DLL 220 and ends at the base DLL 210.

Figure 2B:
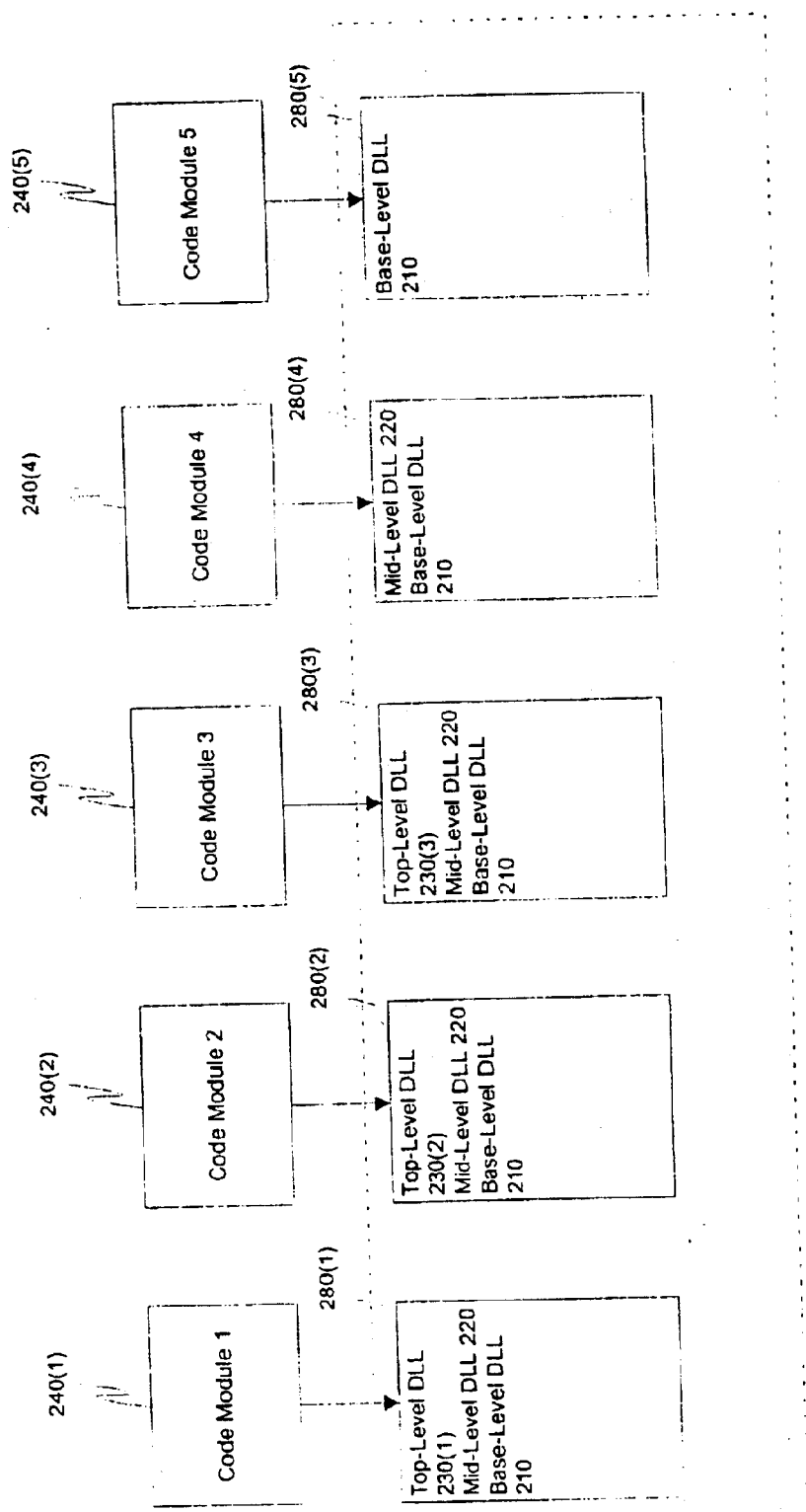
FIG. 2B is an alternative representation of a resource data structure.

The DLL structure 200 can be implemented as a text file listing of DLLs, in access priority order, or as a linked list of DLLs, or in any other way of storing a prioritized list of DLLs. The DLL structure 200 can also be implemented as a plurality of lists or other structures. For example, each code module can be associated with a separate text file containing a list of the various DLLs used by that code module, in access priority order. An embodiment using separate text files is shown in FIG. 2B. A DLL structure 270 includes DLL lists 280 linked with code modules 240. Each code module 240 is linked to a corresponding DLL list 280, which contains a list of the DLLs in the access path (from the DLL structure 200 of FIG. 2A) for that code module 240. For example, the first code module 240(1) is associated with the first DLL list 280(1). The first DLL list 280(1) contains the top-level DLL 230(1), the mid-level DLL 220 and the base DLL 210, listed in access priority order, as shown by the access path for the first code module 240(1). The other code modules 240 are similarly associated with the other DLL lists 280.

Figure 3:
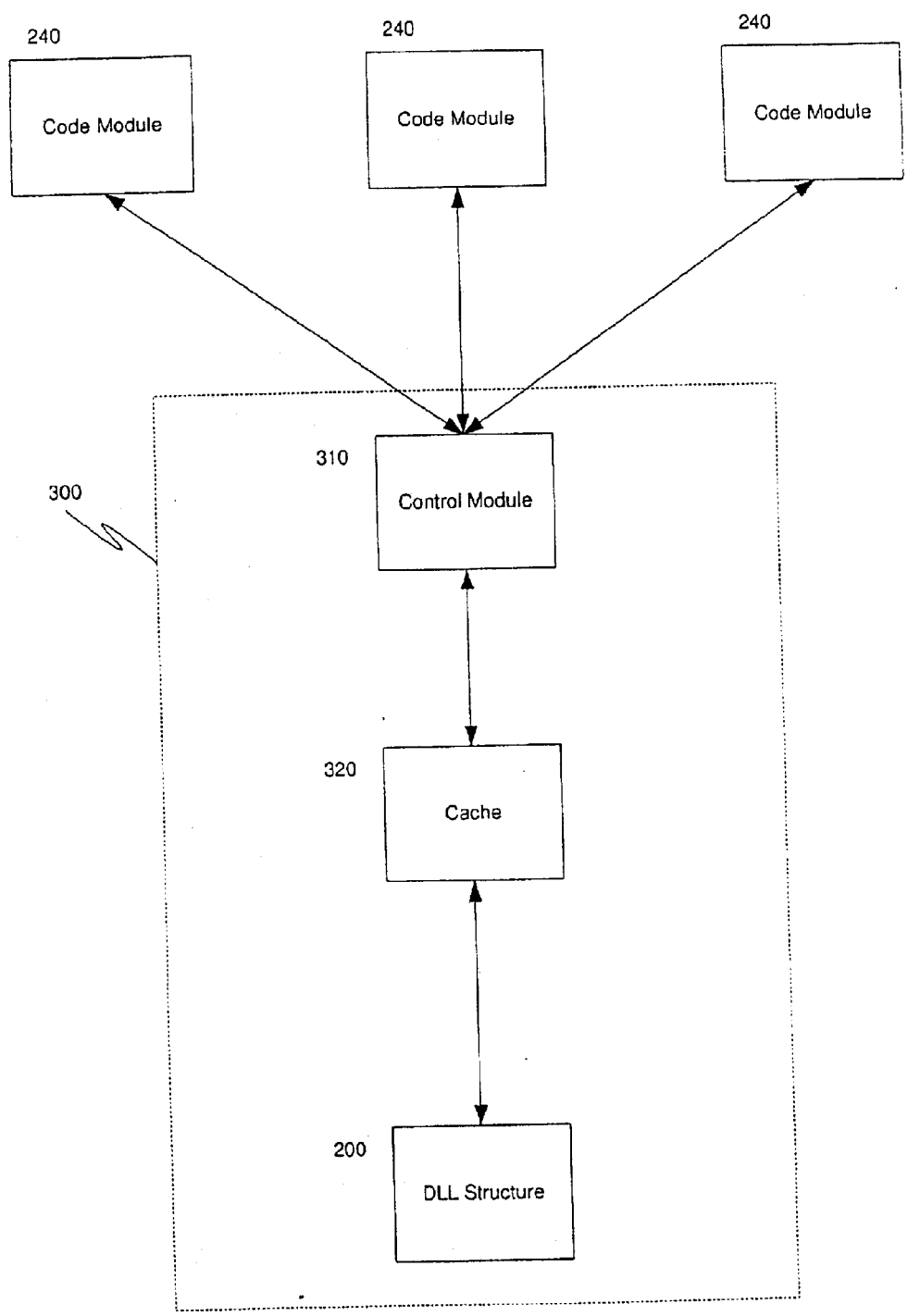
FIG. 3 is a block diagram of a resource management system.

The DLL structure 200 of FIG. 2A is used in the resource management system 300 of FIG. 3. The resource management system 300 includes the DLL structure 200, and a control module 310. The control module 310 is adapted to navigate the DLL structure 200 and locate resources stored in the DLL structure 200 or in DLLs referenced in the DLL structure 200. The control module 310 receives resource requests from the code modules 240, and uses those resource requests to locate corresponding resource entries in the DLLs referenced in the DLL structure 200. The control module 310 is a generalized module whose program logic is not dependent on the particular DLLs present in the DLL structure 200. DLLs can be added to, removed from, or modified in the DLL structure 200 without requiring changes to the program logic of the control module 310.

Optionally, a cache 320 is associated with the DLL structure 200. The cache 320 is adapted to contain one or more data paths pointing to resource values 150 that have already been successfully loaded in prior calls to the DLL structure 200 by the code modules 240. Caching successfully loaded resource values 150 further speeds up subsequent calls to load the cached resource values 150.

Figure 4:
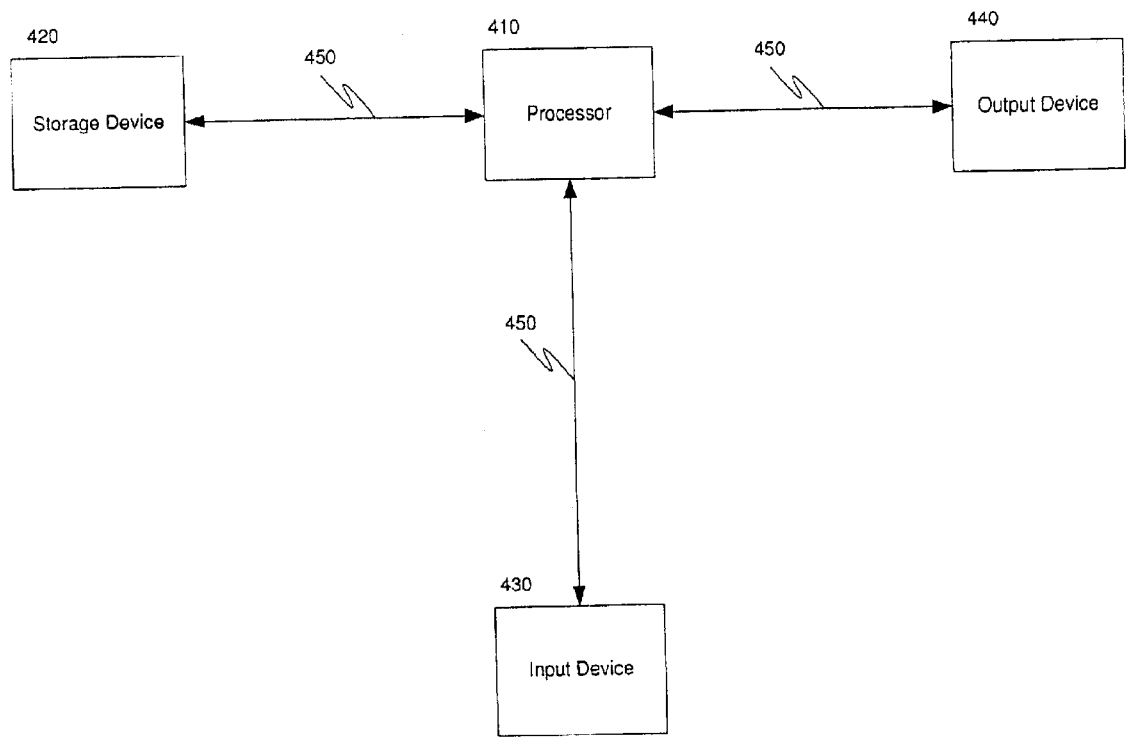
FIG. 4 is a block diagram of a computer system.

Turning to FIG. 4, an example computer system 400 that can be used to implement the resource manager 300 is shown. The computer system 400 includes a processor 410, which receives data from various other components of the computer system 400, processes the data, and sends the data to the various other components of the computer system 400. The computer system 400 also includes a storage device 420, such as a hard disk, floppy disk, or memory. The storage device 420 is a computer-readable medium that stores sequences of instructions which, when executed by the processor 410, cause the processor to perform the methods of an embodiment of the invention. The computer system 400 also includes an input device 430, such as a keyboard, mouse, data port, communications link, etc. The input device receives input from external sources and routes that input to the processor 410. The computer system 400 also includes an output device 440, such as a printer, CRT monitor, audio speaker, communications link, etc. The output device 440 receives output from the processor 410 and transmits the output to external receivers, such as the visual and aural senses of a user, an output medium such as a piece of paper in a printer, or another computer-readable medium such as a network interface, a hard disk, or other similar entities. The various components of the computer system 400 are linked by data paths 450. In embodiments where the components of the computer system 400 comprise pluralities of sub-components, there are data paths 450 linking the sub-components to other sub-components within the same component as well.

The resource manager 300 can be implemented in hardware situated on a data path 450 between the code modules 240 and the DLLs stored in the DLL structure 200. For example, where the code modules 240 and the DLL structure 200 are stored in the storage device 420, the resource manager 300 can be implemented as a sub-component of the processor 410, such as one or more integrated circuits for processing resource requests. The resource manager 300 can also be implemented in software, for example as one or more functional code units or programs running on the processor 410. The resource manager 130 can also be represented as a computer program product stored on a computer-readable medium, such as a data file stored on the storage device 420, or a data stream transmitted across the data path 450 or another communications medium, such as a wire, infrared beam, radio wave, fiber optic cable, etc., or any other way of storing or transmitting computer code.

Figure 5:
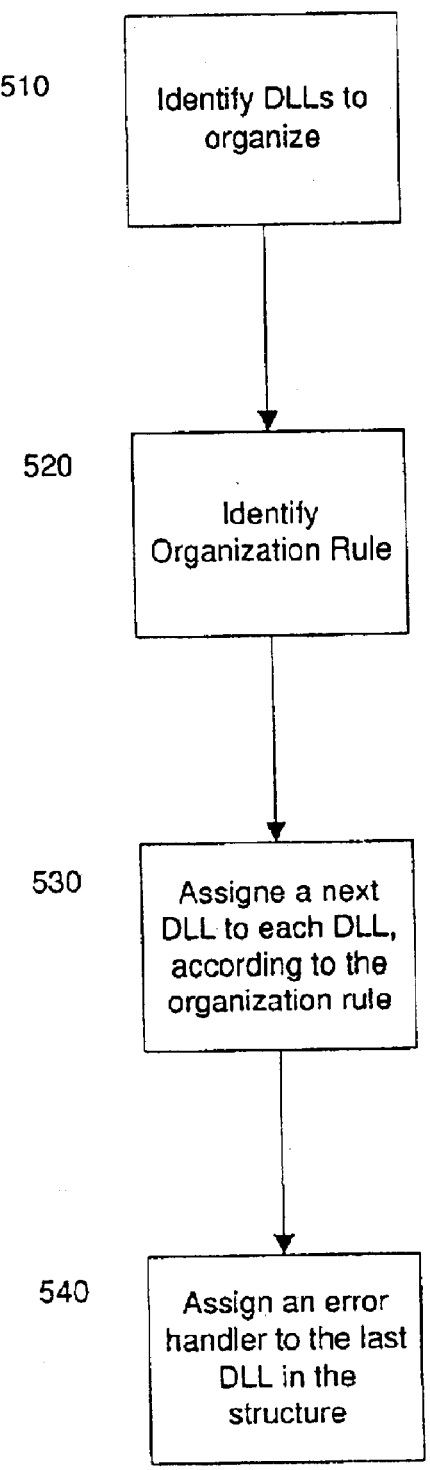
FIG. 5 is a flowchart of a method for creating a resource data structure.

The DLL structure 200 is created by the method of FIG. 5. The DLLs resident in the computer system are identified, either by a developer or by an automated process, as DLLs to be organized into the DLL structure 200, at step 510. The developer or automated process identifies an organization scheme, such as the scheme based on the access priority rule as discussed above, to use on the DLLs, at step 520.

At step 530, the developer or automated process assigns a next calling DLL to each DLL in the collection, except for the base DLL 210, based on the organization scheme. For example, where the organization scheme is an access priority scheme, each DLL 220, 230 is assigned a DLL next lower in priority as the next calling DLL. Where there is more than one DLL next lower in priority, the developer or automated process selects one of the next lower priority DLLs as the next calling DLL, based on criteria such as the contents of the various next lower priority DLLs, or by applying a tiebreaker rule of some sort. Optionally, the next lower priority DLLs are chained together and called in sequence. Thus, referring back to FIG. 2, the top level DLLs 230 are each assigned the mid-level DLL 220 as the next calling DLL. Likewise, the mid-level DLL 220 is assigned the base DLL 210 as its next calling DLL.

Finally, at step 540 the lowest ranking DLL in the DLL structure 200 is assigned an error handler 260 as the next calling DLL. This accounts for the condition where a code module 240 calls the DLL structure 200 using a resource identifier 140 that is not present in any of the DLLs in the access path belonging to the calling code module 240. The assignments can be explicit assignments, such as made in building a linked list of DLLs. alternatively, the assignments can be implicit assignments, such as made in listing the DLLs in priority order in a text file stored on the computer system.

Figure 6:
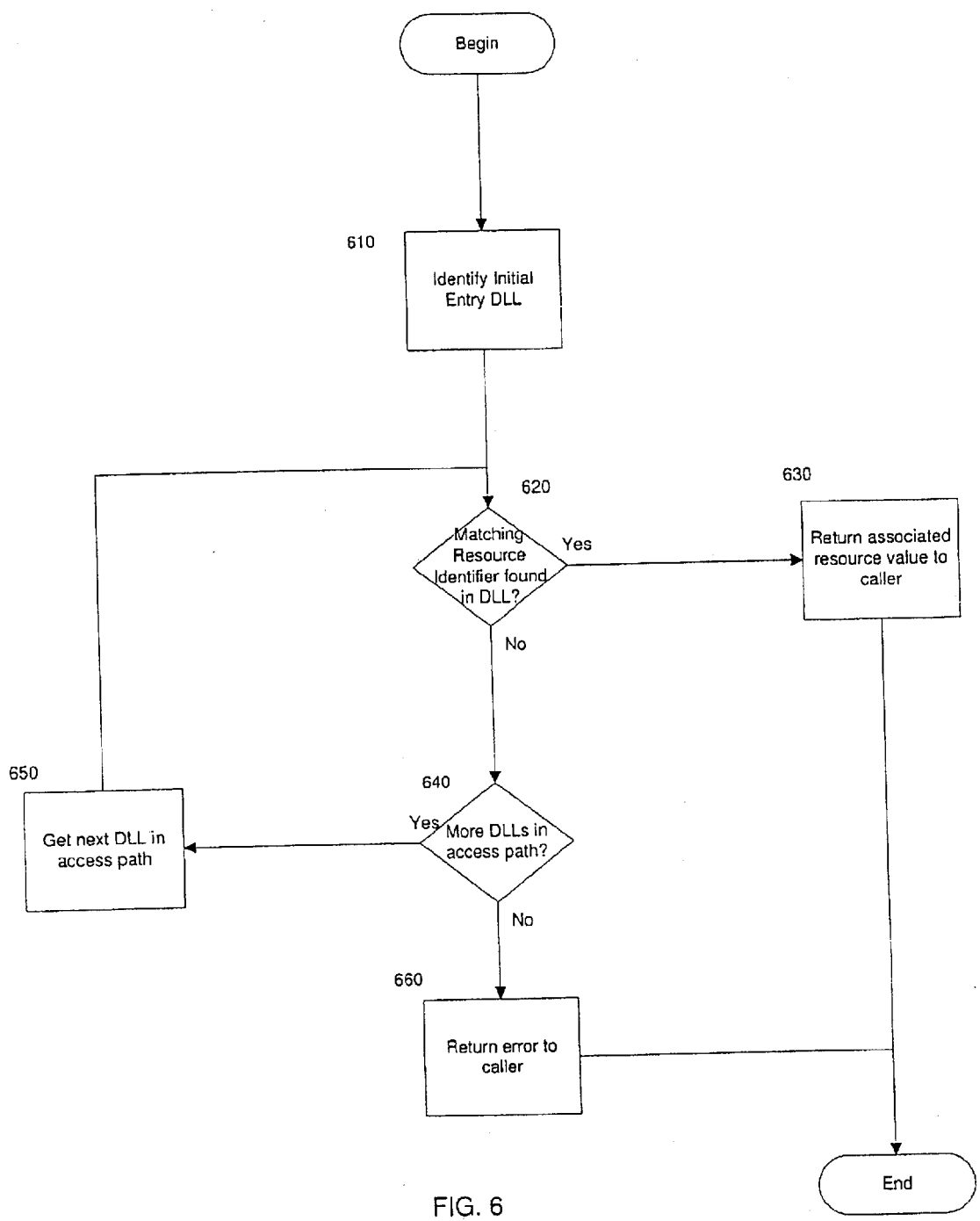
FIG. 6 is a flowchart of a method of accessing a resource data structure.

Once the DLL structure 200 has been created, code modules 240 access resource values 150 referenced in the DLL structure 200 according to the method of FIG. 6. At step 605, the DLL control module receives from a code module 240 a resource request containing a resource request criterion. At step 610, the initial entry DLL for the code module 240 is identified by the DLL control module. The initial entry DLL can be any DLL referenced in the DLL structure 200, as discussed above. At step 620, the DLL control module examines the initial entry DLL to see if a resource identifier 140 that matches the resource request criterion submitted by the calling code module 240 is present in the initial entry DLL. If there is a matching resource identifier 140, then at step 630, the DLL control module returns the resource value 150 associated with the matched resource identifier 140 to the calling code module 240, and optionally writes the resource entry 150 to the cache 320.

If the initial entry DLL does not have a resource identifier 140 matching the resource request criterion submitted by the calling code module 240, then at step 640, the DLL control module checks to see if there is another DLL in the access path for the calling code module 240. If such a DLL exists, then at step 650, the DLL control module traverses the DLL structure 200 to the next DLL in the access path associated with the calling code module 240, and then returns to step 620, where this DLL is examined, as discussed above. If there are no remaining unsearched DLLs in the access path for the calling code module 240, then at step 660, the DLL control module traverses the DLL structure 200 to the error handler 260, which returns an error condition to the calling code module 240.

Figure 7A:
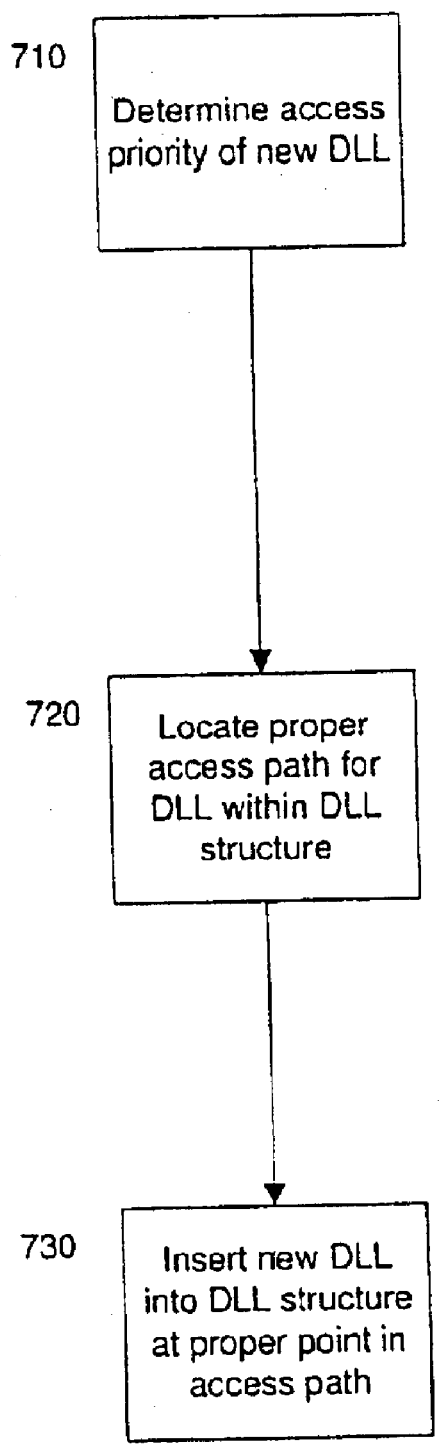
FIG. 7A is a flowchart of a method of adding a resource to a resource data structure.
Figure 7B:
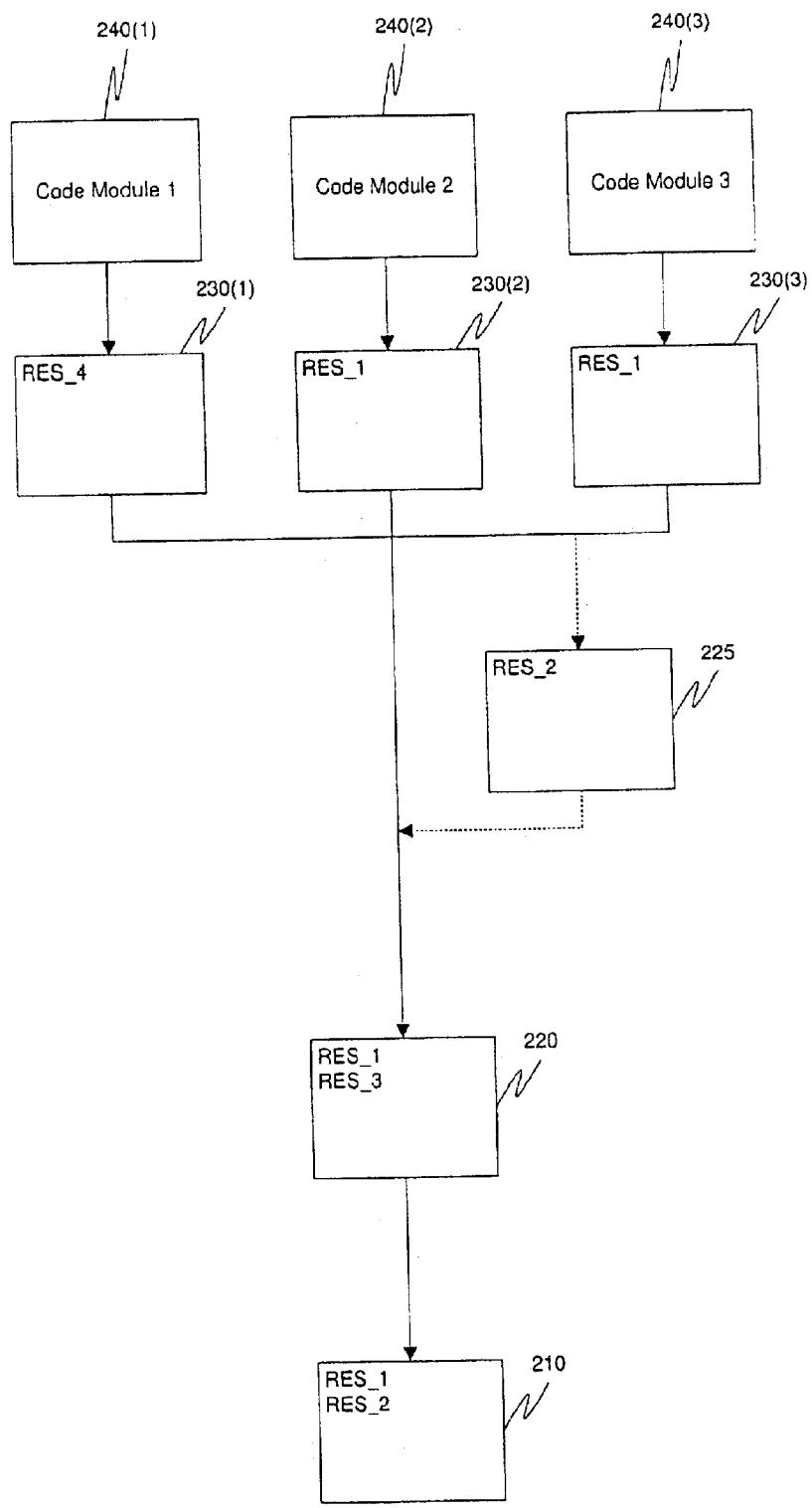
FIG. 7B is a depiction of a resource being added to a resource data structure.

The DLL structure 200 is also easily modified should it be desired to add or remove DLLs from the DLL structure 200. Following the method of FIG. 7A, with reference to FIG. 7B, a new DLL 225 associated with a code module 240 can be seamlessly inserted. At step 710, the access priority of the new DLL 225 is determined by a priority determiner, such as a developer of the new DLL 225, a user of the new DLL 225, an automated process, or other similar means. At step 720, the priority determiner examines the DLL structure 200 to determine where in the access path for the code module 240 to insert the new DLL 225, based on the priority of the new DLL 225. For example, assuming the new DLL 225 is on the access path for the code module 240(2), and has a higher priority than the mid-level DLL 220, but lower priority than the top-level DLL 230(3), then the new DLL 225 is inserted on the access path for the code module 240(2), between the top level DLL 230(3) and the mid-level DLL 220.

At step 730, the priority determiner adds the new DLL 225 into the DLL structure 200 at the proper point as identified above, for example by causing the immediately higher priority DLL (here the top-level DLL 230(3)) to point to the new DLL 225, and then causing the new DLL 225 to point to the immediately lower priority DLL (here the mid-level DLL 220) as the next calling DLL for the new DLL 225. If the new DLL 225 is to be shared by more than one code module 240, then the above procedure is followed for each code module 240 that shares the new DLL 225. Adding a new DLL 225 to the DLL structure 200 can result in a new layer 205 being added to the DLL structure 200, or the new DLL 225 may be added to an existing layer 205. No modifications to the control module 310 are required. When the control module 310 encounters the newly added DLL, it examines the DLL using the same control logic as for examining the other DLLs in the DLL structure 200.

Figure 8A:
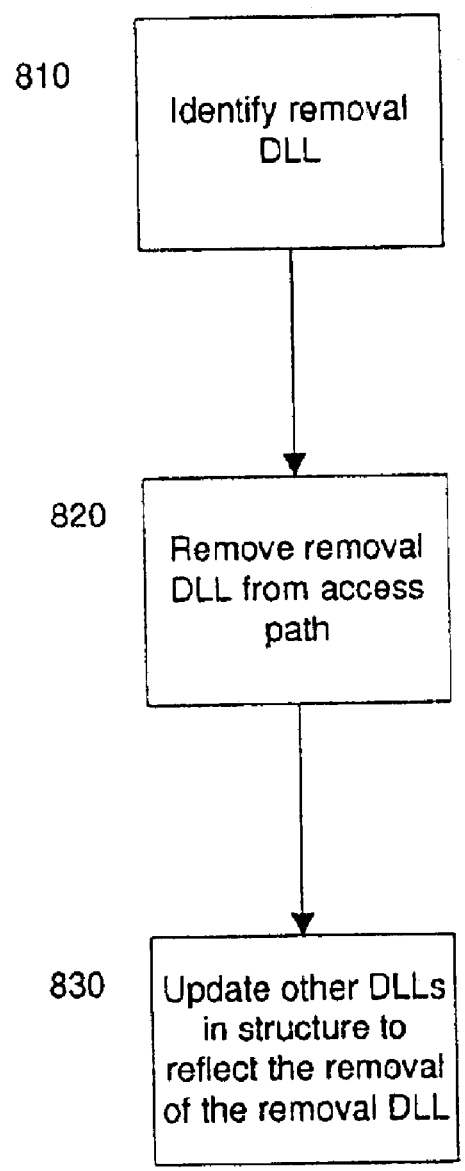
FIG. 8A is a flowchart of a method of removing a resource from a resource data structure.
Figure 8B:
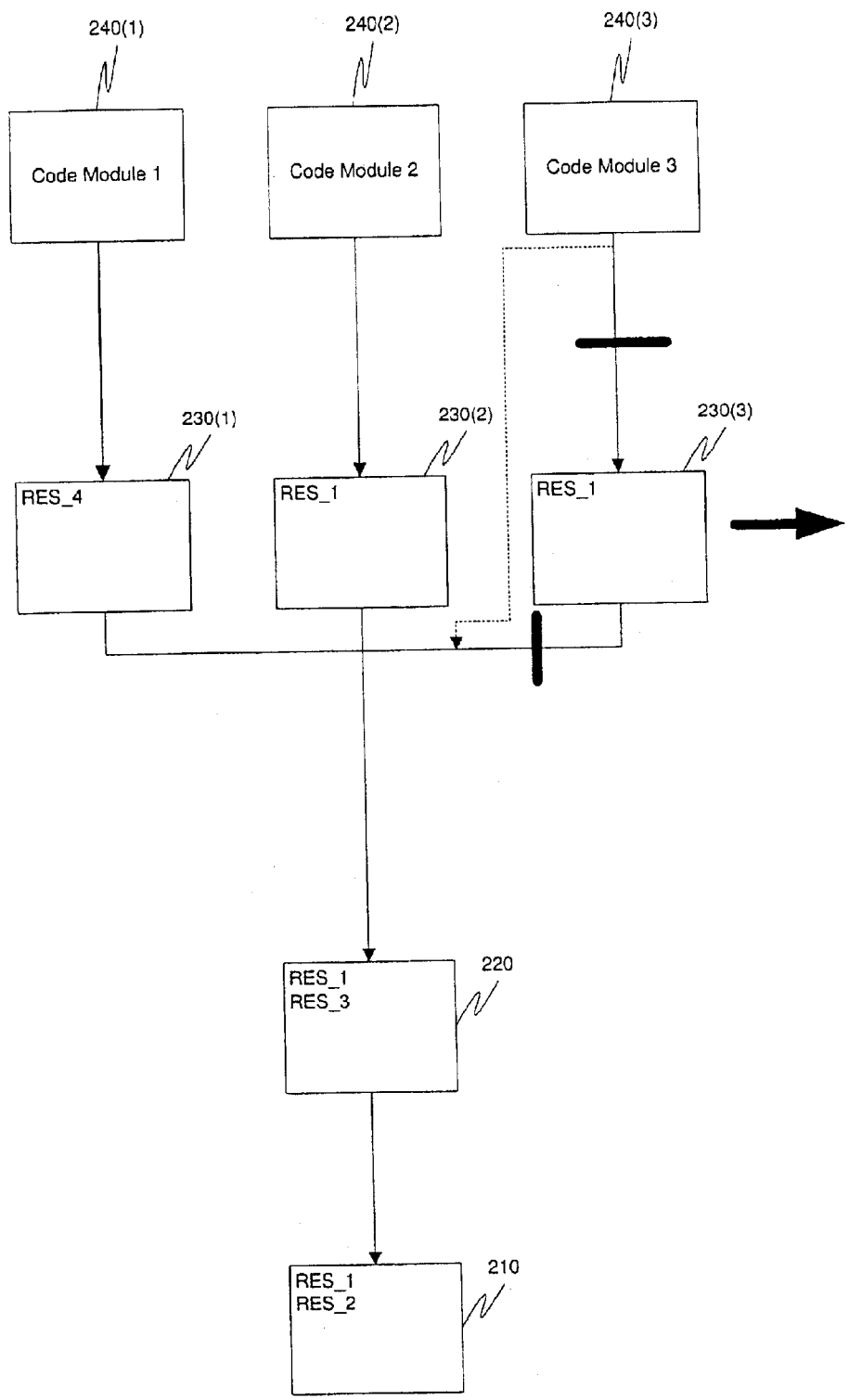
FIG. 8B is a depiction of a resource being removed from a resource data structure.

Removing a DLL follows the method of FIG. 8A, with reference to FIG. 8B. At step 810 a DLL associated with a code module 240 is identified as the removal DLL. The removal DLL may be identified by a user of the computer system the removal DLL is stored on, or may be identified by an automated process, such as the DLL control module or a de-installer for a code module 240. For example, in FIG. 8B the top-level DLL 230(3), associated with the code module 240(3), is identified as the removal DLL. At step 820, the removal DLL is removed from the access path for the code module 240 by the DLL control module. Thus, according to FIG. 8B, the top-level DLL 230(3) is removed from the access path for the code module 240(3). At step 830, the code module 240 or DLL that pointed to the removal DLL is updated to point to the next DLL after the removal DLL in the access path for the code module 240. Thus in FIG. 8B, the code module 240(3) is updated to point to the mid-level DLL 220. If the removal DLL was shared between multiple code modules 240, then the above procedure is followed for each access path from which the removal DLL is removed. No modifications to the control module 310 are required. When the control module 310 encounters the updated pointer in the DLL that formerly pointed to the removal DLL, the control module 310 traverses the pointer to the next DLL, using the same control logic as for examining the other DLLs in the DLL structure 200.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

We claim:

1. A resource data structure, comprising:
    a first resource having a first access priority;
    a second resource having a second access priority; and
    an access path linking the first resource and the second resource,
    wherein the first access priority is higher than the second access priority and the access path links the first resource to the second resource such that the first resource is examined before the second resource.

2. The resource data structure of claim 1, wherein the first resource and the second resource each comprise an element of a linked list of resources.

3. The resource data structure of claim 1, wherein the first resource and the second resource each comprise an entry in a text file listing of resources.

4. The resource data structure of claim 1, wherein the first resource and the second resource each comprise a plurality of resource entries, each resource entry comprising a resource identifier and a resource value.

5. The resource data structure of claim 4, wherein the plurality of resource entries forms a DLL.

6. The resource data structure of claim 1, wherein the first resource an the second resource each comprise a pointer to a plurality of resource entries.

7. A system for managing resources comprising:
    a resource data structure comprising a plurality of resources, the plurality of resources comprising:
        a first resource having a first access priority, and
        a second resource having a second access priority,
        wherein the first access priority is higher than the second access priority; and
    a control module adapted to examine the resource data structure based on a resource request;
    wherein the control module is not modified when a resource is added to, removed from, or modified in the resource data structure.

8. The system of claim 7, wherein the resource data structure further comprises an access path linking the first resource and the second resource and wherein the access path links the first resource to the second resource such that the control module examines the first resource before the second resource.

9. The system of claim 7, further comprising a cache to hold a path to a successfully loaded resource, the successfully loaded resource being a member of the resource data structure.

10. The system of claim 7, wherein the first resource and the second resource each comprise an element of a linked list of resources.

11. The system of claim 7, wherein the first resource and the second resource each comprise an entry in a text file listing of resources.

12. The system of claim 7, wherein the first resource and the second resource each comprise a plurality of resource entries, each resource entry comprising a resource identifier and a resource value.

13. The system of claim 11, wherein the plurality of resource entries forms a DLL.

14. The system of claim 7, wherein the first resource an the second resource each comprise a pointer to a plurality of resource entries.

15. The system of claim 7, wherein the control module is adapted to not examine the second resource if the first resource is successfully loaded.

16. A method for loading a resource, comprising:
    receiving a resource request criterion from a code module;
    examining a list of resources, the list of resources being listed in access priority order; and
    loading a resource corresponding to the resource request criterion if the resource corresponding to the resource request criterion is located in the list of resources.

17. The method of claim 16, further comprising returning an error condition to the code module if the resource corresponding to the resource request criterion is not located.

18. The method of claim 16, wherein examining the list of resources further comprises iterating through the list of resources starting from a highest priority resource.

19. The method of claim 16, further comprising caching a path to the resource once the resource has been located.

20. The method of claim 16, further comprising halting the examination of the resource list once the resource is successfully located.

21. The method of claim 16, wherein the list of resoures comprises a list of DLLs.

22. A method for organizing resources, comprising:
selecting a first resource having a first access priority;
selecting a second resource having a second access priority, the second access priority being lower than the first access priority; and
creating a link between the first resource and the second resource such that the first resource is examined prior to the second resource.

23. The method of claim 22, wherein the first resource and the second resource comprise DLLs.

24. The method of claim 22, wherein the link is explicit.

25. The method of claim 22, wherein the link is implicit.

26. A computer-usable medium comprising a sequence of instructions which, when executed by a processor, causes the processor to perform a method for loading a resource, the method comprising:
receiving a resource request criterion from a code module;
examining a list of resources, the list of resources being listed in access priority order; and
loading a resource corresponding to the resource request criterion if the resource corresponding to the resource request criterion is located in the list of resources.

27. The computer-usable medium of claim 26, further comprising returning an error condition to the code module if the resource corresponding to the resource request criterion is not located.

28. The computer-usable medium of claim 26, wherein inspecting the list of resources further comprises iterating through the list of resources starting from a highest priority resource.

29. The computer-usable medium of claim 26, further comprising caching a path to the resource once the resource has been located.

30. The computer-usable medium of claim 26, further comprising halting the inspection once the resource is successfully located.

31. The computer-usable medium of claim 26, wherein the list of resoures comprises a list of DLLs.

32. A computer-usable medium comprising a sequence of instructions which, when executed by a processor, causes the processor to perform a method for organizing resources, comprising:

selecting a first resource having a first access priority;

selecting a second resource having a second access priority, the second access priority being lower than the first access priority; and creating a link between the first resource and the second resource such that the first resource is examined prior to the second resource.

33. The computer-usable medium of claim 32, wherein the first resource and the second resource comprise DLLs.

34. The computer-usable medium of claim 32, wherein the link is explicit.

35. The computer-usable medium of claim 32, wherein the link is implicit.

* * * * *